H. M. DUDLEY.
FIBER TREATING MACHINE.
APPLICATION FILED DEC. 3, 1918.

1,344,122.

Patented June 22, 1920.
13 SHEETS—SHEET 3.

H. M. DUDLEY.
FIBER TREATING MACHINE.
APPLICATION FILED DEC. 3, 1918.

1,344,122.

Patented June 22, 1920.

H. M. DUDLEY.
FIBER TREATING MACHINE.
APPLICATION FILED DEC. 3, 1918.

1,344,122.

Patented June 22, 1920.
13 SHEETS—SHEET 8.

H. M. DUDLEY.
FIBER TREATING MACHINE.
APPLICATION FILED DEC. 3, 1918.

1,344,122.

Patented June 22, 1920.
13 SHEETS—SHEET 10.

Inventor
Howard M. Dudley
By his Attorney

H. M. DUDLEY.
FIBER TREATING MACHINE.
APPLICATION FILED DEC. 3, 1918.

1,344,122.

Patented June 22, 1920.
13 SHEETS—SHEET 12.

H. M. DUDLEY.
FIBER TREATING MACHINE.
APPLICATION FILED DEC. 3, 1918.

1,344,122.

Patented June 22, 1920.
13 SHEETS—SHEET 13.

UNITED STATES PATENT OFFICE.

HOWARD M. DUDLEY, OF PHILADELPHIA, PENNSYLVANIA.

FIBER-TREATING MACHINE.

1,344,122.  Specification of Letters Patent.  Patented June 22, 1920.

Application filed December 3, 1918. Serial No. 265,091.

*To all whom it may concern:*

Be it known that I, HOWARD M. DUDLEY, a citizen of the United States, and a resident of Philadelphia, in the county of Philadelphia and State of Pennsylvania, have invented certain new and useful Improvements in Fiber-Treating Machines, of which the following is a specification.

My invention relates to fiber treating machines and refers particularly to those suitable for the treatment of different classes of fiber masses.

One object of my invention is a machine in which textile fibers and fabrics of various kinds may be treated and dyed.

Another object of my invention is a device in which textile fibers and fabrics in the condition of loose fiber, warps, balls, tops, beams, piece goods and other textile forms may be treated and dyed equally and evenly while the fiber is under pressure.

Another object of my invention is a device in which the contained air may be readily removed by the flow of the liquid, thus insuring a more complete penetration of the fiber.

These and other objects of my invention will be evident upon a consideration of the drawings, specification and claims forming a part of this application.

In the production of textile fabrics, the fiber is produced in a great number of forms, such as; loose fiber, solid balls, warps, wound balls, beams, piece goods, etc., depending upon the conditions of production and the character of the goods to be produced.

It is sometimes much more advantageous to dye and treat the fiber in one condition than it is to dye and treat it in another condition and hence a device which can be used for the treating and dyeing of similar kinds of fiber forms, fiber masses and fiber fabrics is most desirable and valuable.

In the use of the present employed devices a number of machines must be used for this purpose as none of them is adaptable for all classes of dyeing.

I have overcome all of the difficulties incident to the use of a number of machines by incorporating in my device an arrangement of parts and a construction of a machine whereby one machine is suitable for the treating and dyeing of all of the above described fiber forms.

In the accompanying drawings, illustrating several modifications of my device, similar parts are designated by similar numerals.

Fig. 18 is a vertical section of my device showing a modification of the core.

Figure 10:
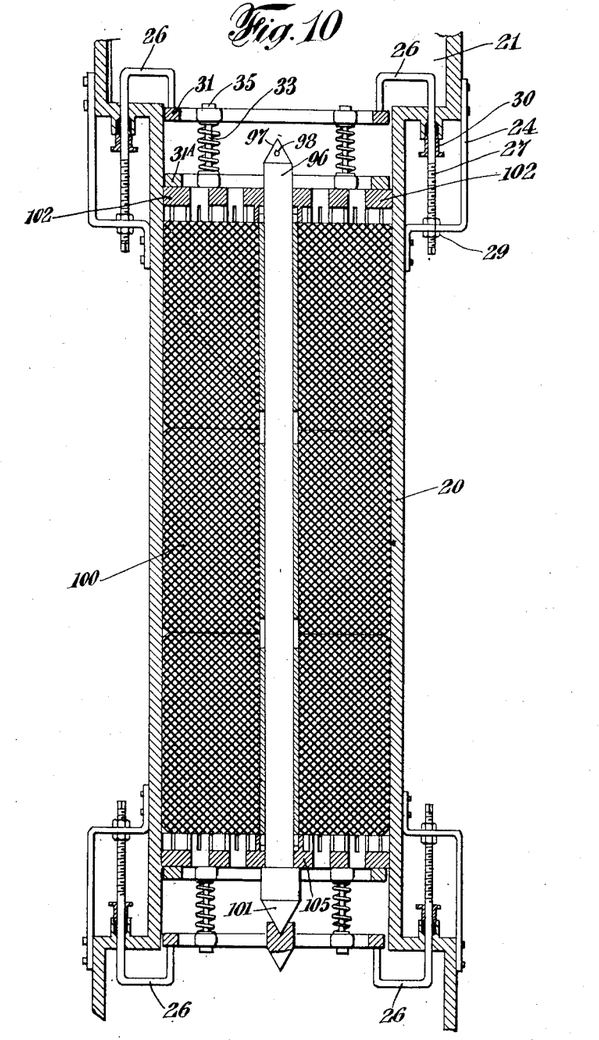
Fig. 10 is a vertical cross-section of my device adapted for dyeing hollow core fiber forms.
Figure 11:
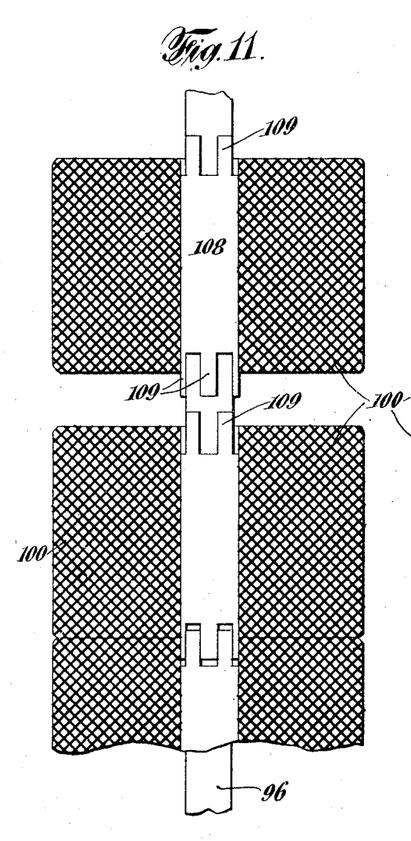
Fig. 11 is an enlarged broken section of the core members of Fig. 10 in a separated position.
Figure 12:
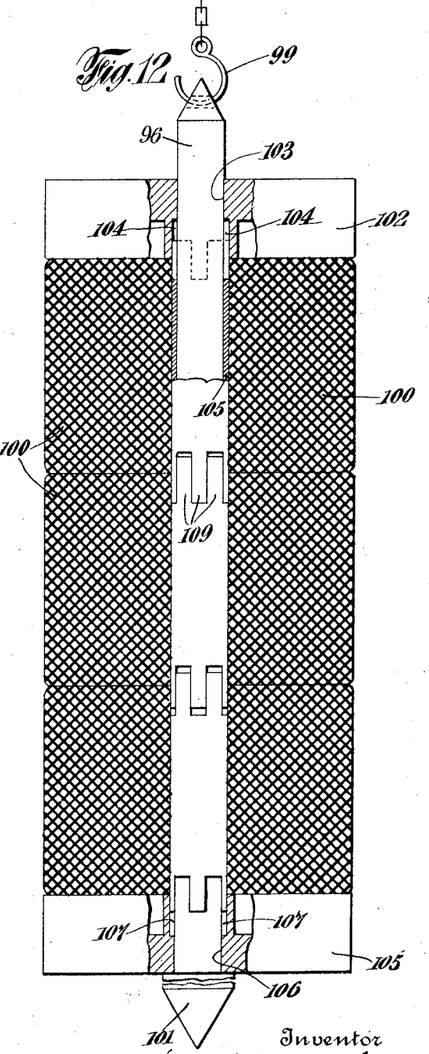
Fig. 12 is an enlarged section of the core members of Fig. 10 showing the inter-locking members.
Figure 13:
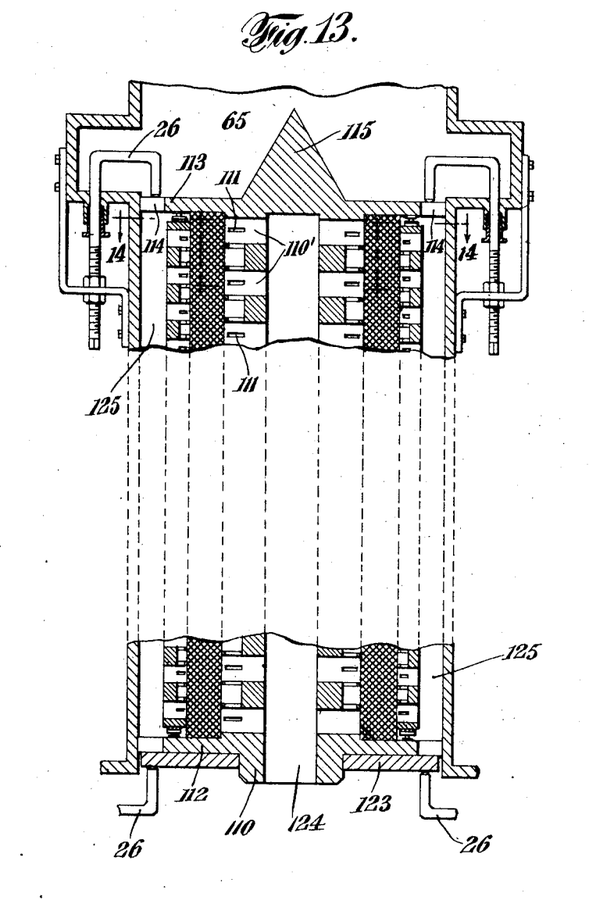
Fig. 13 is a broken vertical cross-section of my device adapted to beam dyeing.
Figures 13, 19:
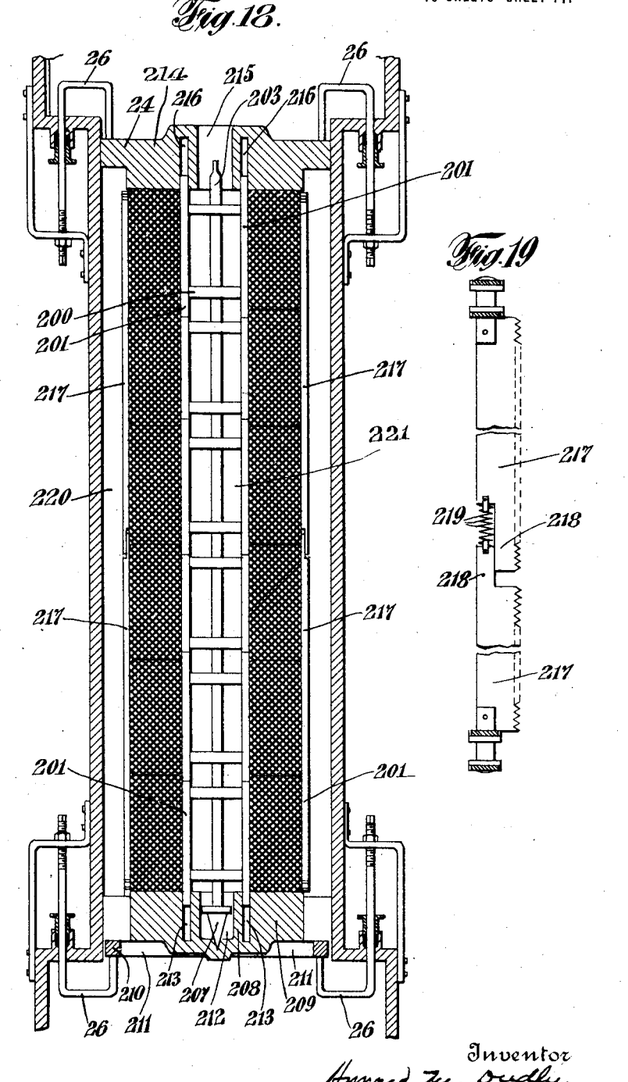
Fig. 19 is a plan view of one of the blade members of the foraminous cover of Fig. 18.
Figures 14, 15, 16, 17:
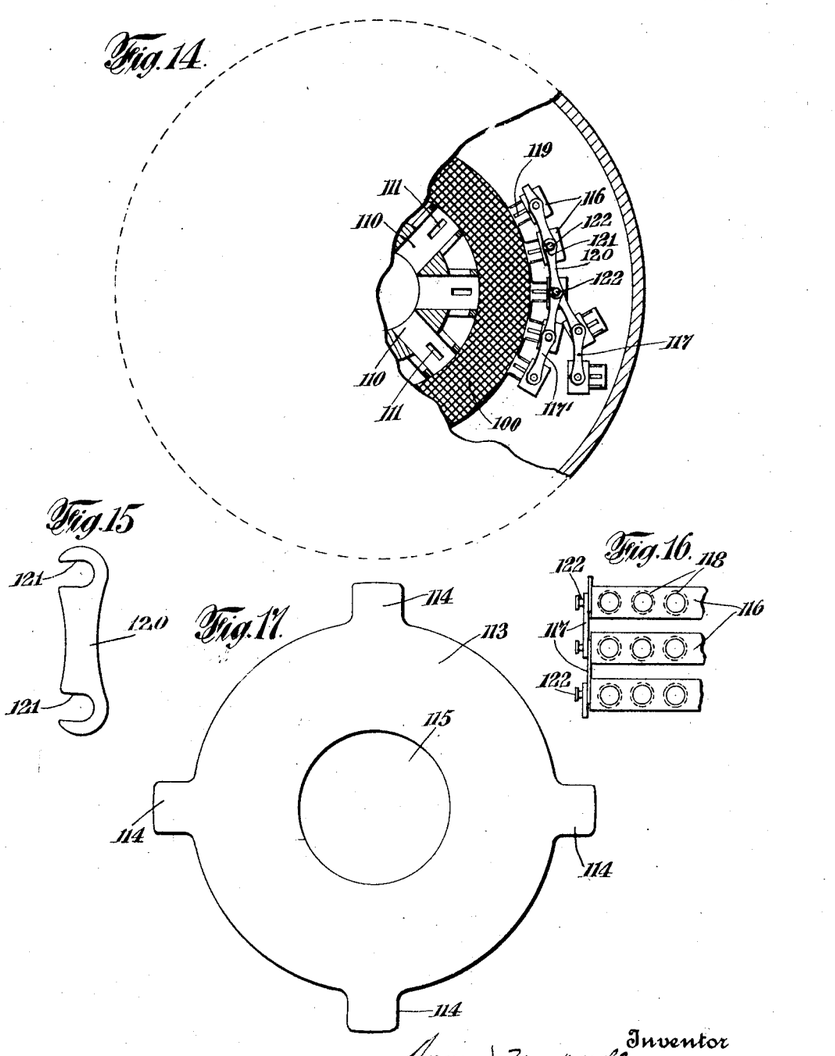
Fig. 14 is a section through the line 14—14 of Fig. 13, partly broken away.
Fig. 15 is a plan view of the foraminous cover hook.
Fig. 16 is a broken top plan view of the foraminous cover.
Fig. 17 is a top plan view of the upper flange of Fig. 13.
Figure 20:
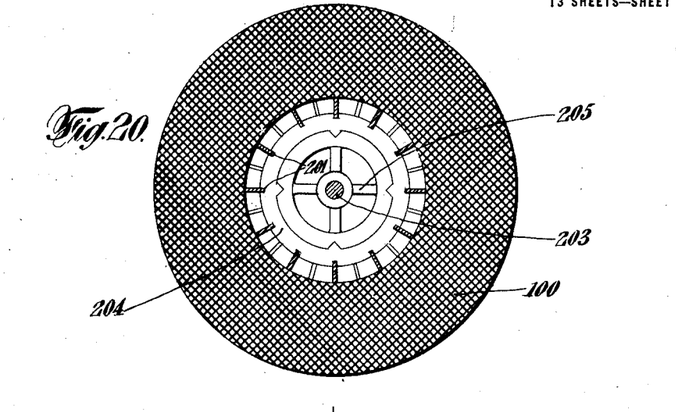
Fig. 20 is a section through the line 20, 20 of Fig. 21.
Figure 21:
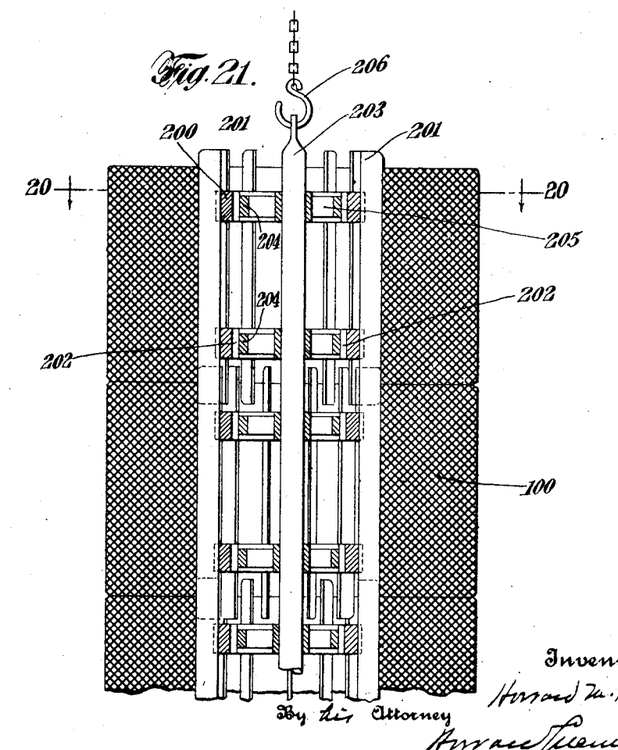
Fig. 21 is an enlarged section of a portion of a modified form of my device with parts removed.

Figs. 1 to 9 illustrate a device suitable for dyeing loose fiber, solid balls, warps, wound balls. Figs. 10 to 12 illustrate a device suitable for hollow core dyeings. Figs. 13 and 14 illustrate a device suitable for dyeing piece goods and beams.

Figure 1:
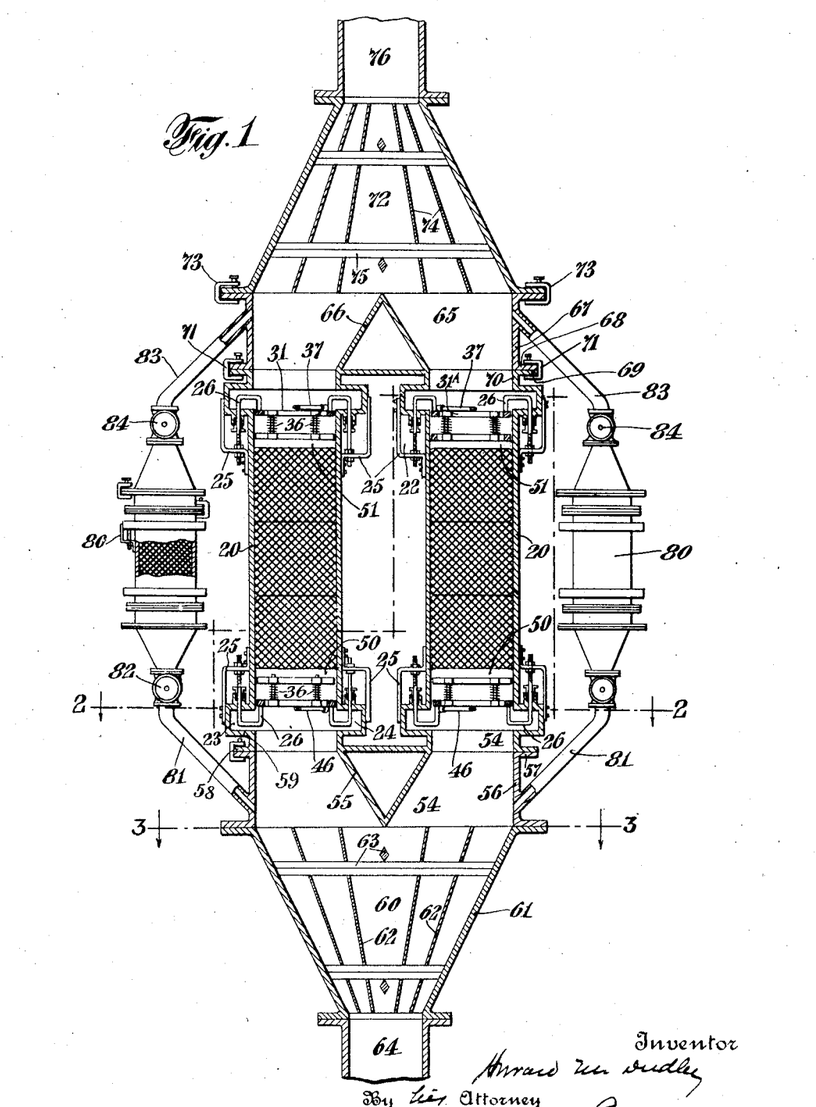
Figure 1 is a vertical cross-section of one form of my device.
Figure 2:
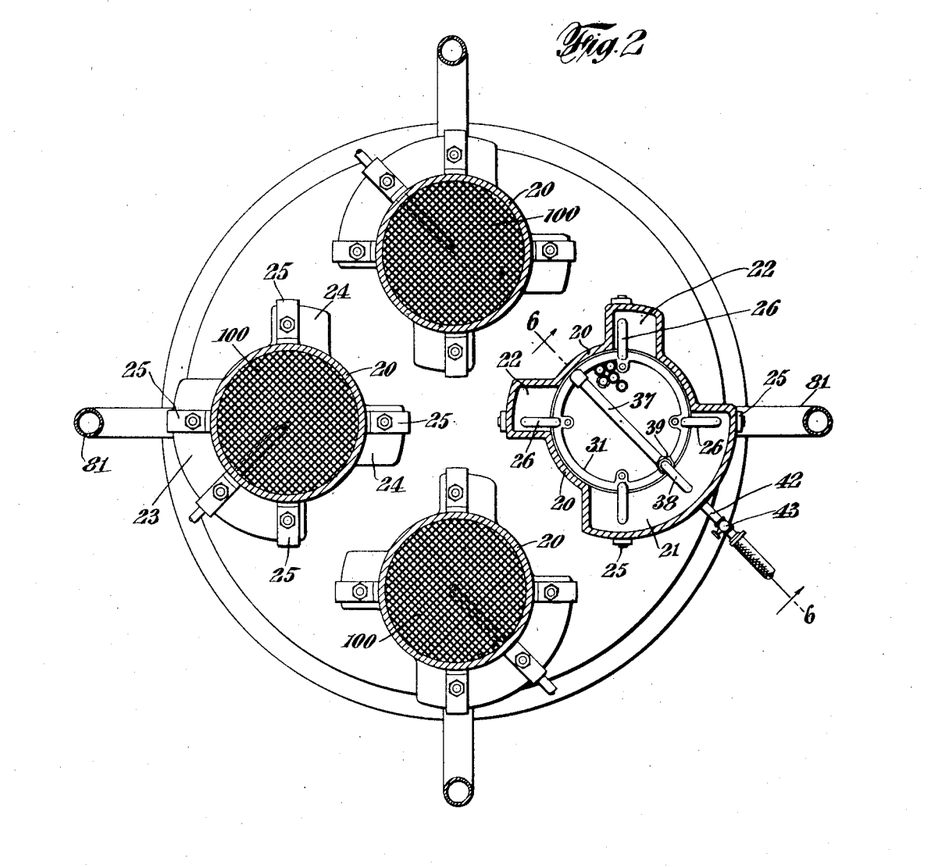
Fig. 2 is a section through the line 2—2 of Fig. 1.
Figure 3:
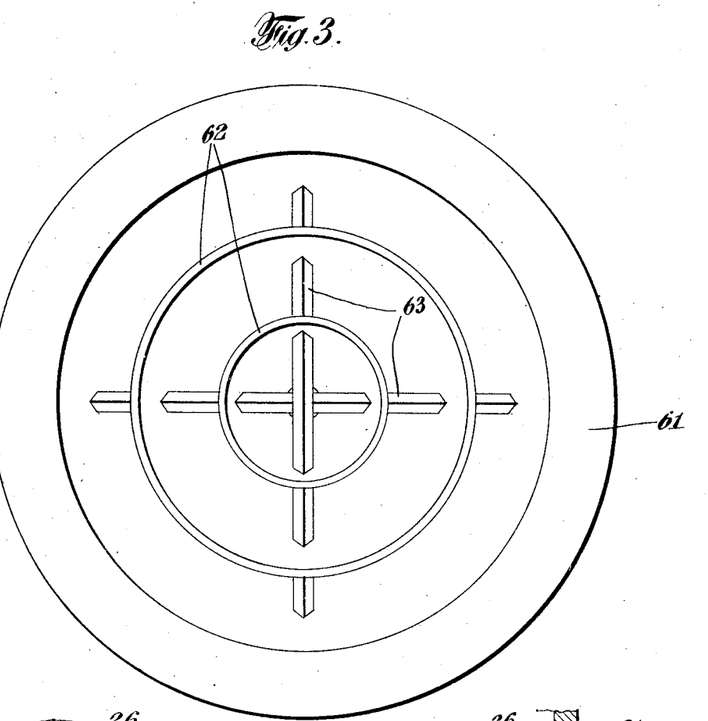
Fig. 3 is a section through the line 3—3 of Fig. 1.

The particular device shown in the accompanying drawings comprises a series of hollow cylindrical dyeing chambers 20, 20, the upper portion of each of which has an outwardly extended chamber 21 and two smaller outwardly extended chambers 22, 22; the lower portion of each member 20 has a corresponding large outwardly extended chamber 23 and two smaller ones 24, 24. A bracket 25 extends from the outer wall of each of the chambers 21, 22, 23 and 24 to the wall of the corresponding cylinder 20. Extending through a hole in each bracket 25 and the wall of the corresponding chamber 21, 22, 23 or 24 is a U-shaped bar 26, one leg of which is shorter than the other. The lower portion 27 of the longer leg is threaded and carries two threaded nuts 28 and 29 upon opposite sides of the bracket 25. An ordinary stuffing box 30 is carried by the wall of the chamber, the rod 26 passing therethrough. The rods 26, 26 can therefore be placed and maintained in any desired vertical position by means of the nuts 28, 29, and they will have a rotary movement around the axis of the longer leg for reasons explained later.

Figure 5:
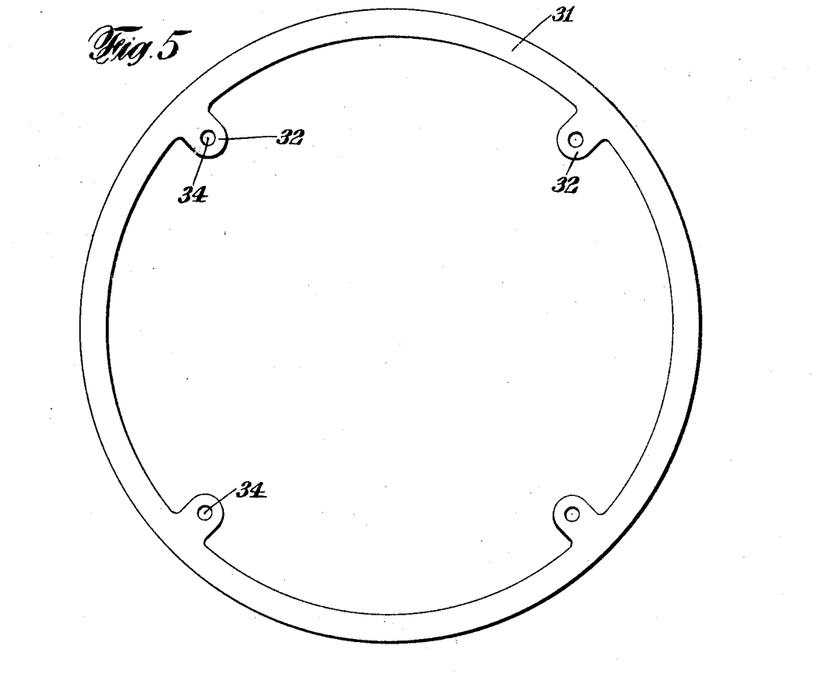
Fig. 5 is an enlarged detached top plan of one of the followers.

At the top and bottom of each of the dyeing chambers 20 is a removable follower comprising two annular members, or rings, 31, 31ᴬ carrying inward extensions 32, 32. The two rings 31, 31ᴬ are connected by a series of bolts 33, 33 fixedly attached to the member 31ᴬ and slidable through the holes 34, 34 of the member 31. A head 35 upon the end of each bolt 33 prevents its disconnection with the hole 34. A spring 36 around each bolt 33 abuts upon the extensions 32, 32 of the members 31, 31ᴬ, having a tendency to force them apart. The end of the shorter arm of the bar 26 is capable of abutment upon the member 31.

Figure 4:
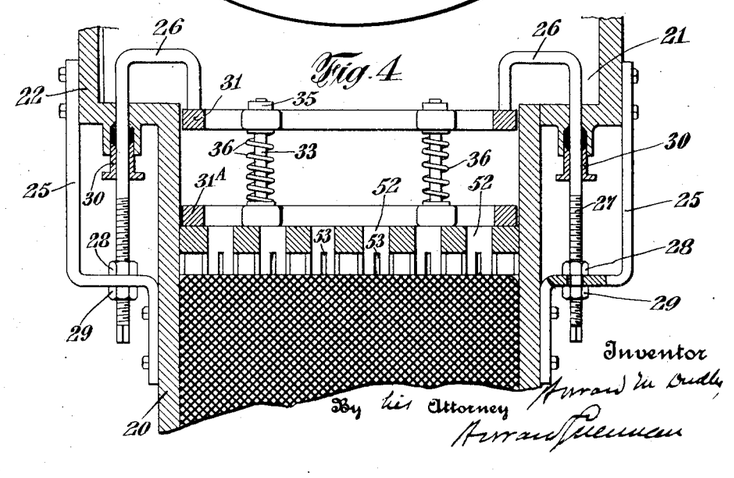
Fig. 4 is an enlarged vertical cross-section of a part of the upper portion of one of the dyeing chambers.

At the upper portion of each dyeing chamber is an air pipe, comprising the perforated member 37 and the U-shaped pipe 38 connected together by a union 39. The longer arm of the pipe 38 extends through the stuffing box 40 and the bracket 41, and is connected to the pipe 42 having the valve 43. The lower portion of the pipe 38 is threaded to engage with the nuts 44 and 45 and is closed by the plug 46. A similar air pipe 46 with similar connections is in the lower portion of each dyeing chamber 20.

Figure 6:
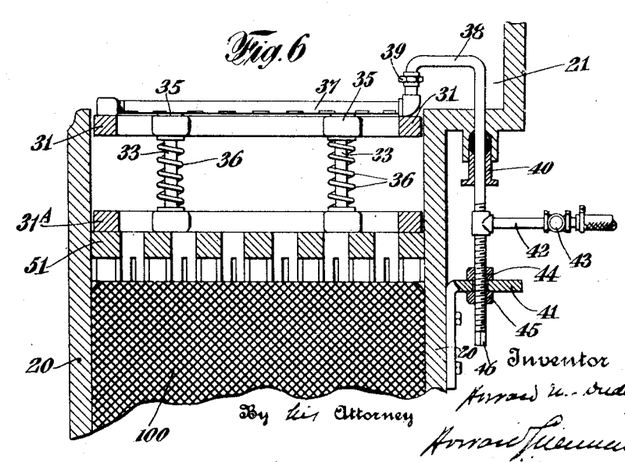
Fig. 6 is a section through the line 6—6 of Fig. 2.
Figures 8, 9:
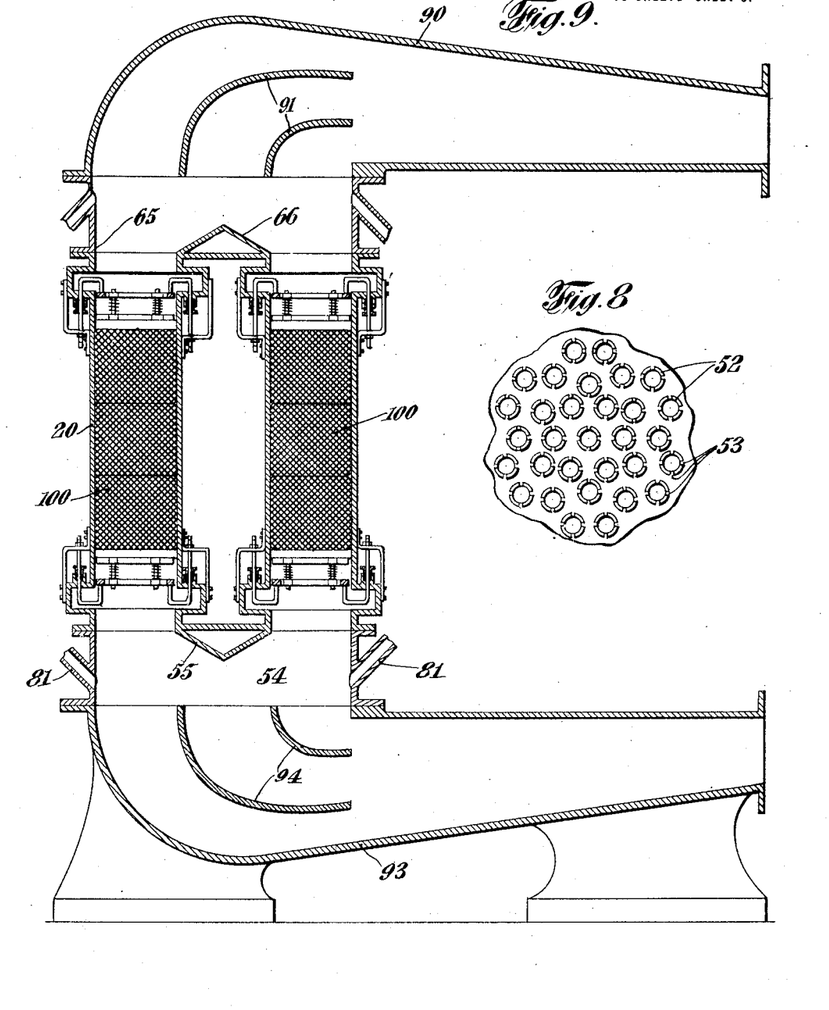
Fig. 8 is a fragmentary plan detail of one of the foraminous plates.
Fig. 9 is a vertical cross-section of a modified form of my device.

The top and bottom foraminous plates 50 and 51 as shown plainly in Figs. 4, 6, and 8 consist of a series of vertically extended hollow cylinders 52, 52 with vertical openings, or slots, 53, 53 therein.

The various dyeing chambers 20 are connected to a liquid chamber 54 by means of the interior imperforate downwardly extended pyramidal member 55, and the outer annular member 56, the flange 57 of the latter being attached to the flange 58 of the annular member 59. The chamber 54 is connected to the hollow downwardly converging chamber 60, formed by the wall 61. Within the chamber 60 is a series of downwardly converging nested cones 62, 62 supported by the bars 63, 63. The lower extremity of the chamber 60 is connected to the pipe 64 which in turn is connected to a source of liquid supply.

The upper portions of the various dyeing chambers 20, 20 are connected to the chamber 65 formed by the upwardly extended imperforate pyramidal member 66 and the annular member 67, the flange 68 of the member 67 being attached to the flange 69 of the annular member 70 by the clamps 71, 71. The chamber 65 is connected to the chamber 72 by the clamps 73, 73. The chamber 72 contains the nested upwardly converging conical members 74, 74, supported by the bars 75, 75 and is connected to the pipe 76, which in turn is connected to a source of liquid supply.

Immediately below each dyeing chamber 20, the chamber 54 is connected to a smaller testing device 80, by means of the pipe 81 carrying the valve 82, and immediately above each dyeing chamber 20, 20, the chamber 65 is connected to the testing device 80 by means of the pipe 83 carrying the valve 84.

Figure 7:
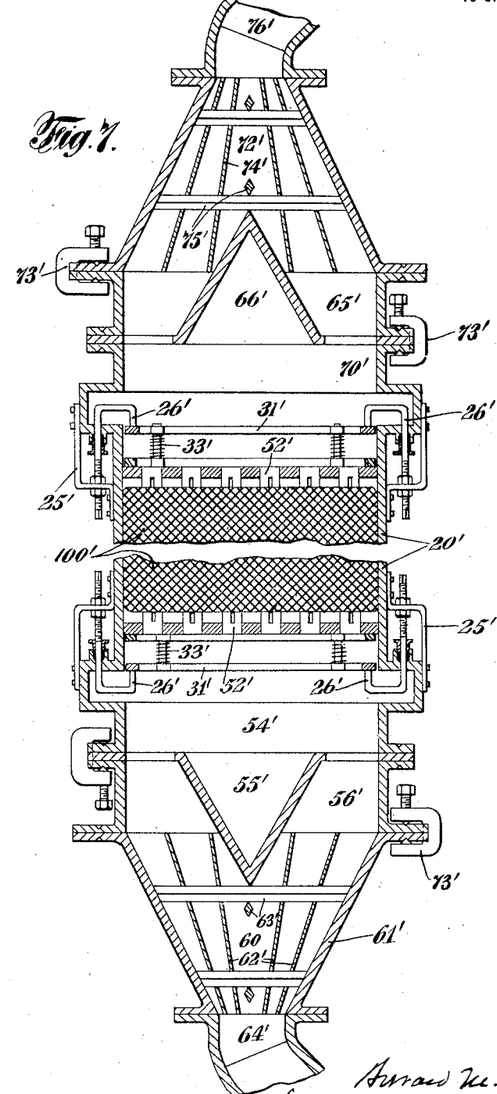
Fig. 7 is an enlarged vertical section of a testing device.

The testing device as shown in Fig. 7 is similar and proportionate to one of the larger dyeing chambers, with the upper and lower connecting chambers, similar parts of the testing device to those of the larger device being indicated by prime numerals.

The operation of this device, which is suitable for dyeing and treating loose fibers, warp balls and other similar solid masses of fiber, is as follows:—

The top 72 is removed, the upper air pipes 37, 37 are removed by means of the coupling 39, and the upper rod arms 26, 26 revolved within the chambers 21, 22, 22, so that the shorter arm thereof will not interfere with the insertion of the plates and material into the dyeing chamber. A follower 31—31ᴬ is then placed within each dyeing chamber resting upon the shorter branch of the lower rod arms 26. A foraminous plate 50 is placed thereon and the fiber 100 placed within the dyeing cylinder 20. A foraminous plate 51 is placed upon the fiber, a follower 31—31ᴬ is placed upon the plate and the upper rod arms 26, 26 are revolved from within the chambers 21, 22, 22 until the shorter arm is above and abuttable upon the member 31 of the follower. By turning the nuts 44, 44, 45, 45 upon the upper and lower rod arms 26, 26 they are brought closer together; the shorter arms thereof pressing upon the followers 31—31^A, 31—31^A which in turn press upon the plates 50 and 51 thus compressing the fiber 100 from both ends of the dyeing chamber 20, forming a homogeneous mass therein. The air pipe 37 is then screwed into place and the top 72 replaced. The corresponding testing device is similarly loaded. When all of the dyeing chambers and testing devices are thus loaded, all of the valves are closed with the exception of valves 82, 82, 84, 84 and the valve on the lower air pipes 46, and dye liquid is forced through the pipe 64. As the liquid passes upwardly through the chambers 60 and 54, it will force the air through the lower air pipes 46, 46. When the liquid has reached the lower air pipes 46, 46, their valves are closed and the liquid then passes upwardly through the lower follower 31—31^A, the foraminous plate 50, the fiber in the dyeing chambers the foraminous plate 51, the upper follower 31—31^A and thence through the chambers 65, 72 and the pipe 76 for continuous circulation. At the same time the liquid passes through the pipes 81, 81, the testing device 80, 80 and their contents and the pipes 83, 83.

The liquid may be forced in a reverse direction through the device in which case in starting the operation, the air in the upper portion of the device is allowed to escape through the upper air pipes 37, 37.

If it is desired to observe the condition of the operation in any dyeing cylinder 20, the valves 82, 84 of the corresponding testing device are closed, and the contents of the testing device examined without interrupting the operation in the larger device.

In the modified form of my device illustrated in Fig. 9, the top member 90, is extended horizontally of the chambers 20, 20 and an even distribution of the liquid passing therethrough is caused by the transverse wall members 91, 91. This modification also has a corresponding bottom member 93, containing the transverse wall members 94, 94.

Figs. 10, 11 and 12 illustrate my device adapted to the dyeing of hollow core wound fiber masses. The removable cylindrical elongated core 96 has an upper conical shaped end 97, with an opening 98 for the insertion of a hook 99 for removing the core. The lower end 101 of the core 96 is of a conical shape. The upper foraminous plate 102 is similar in construction to plate 51, but has an opening 103, through which the core 96 passes. The plate 102 has a series of indents 104, 104, for purposes described later. The bottom foraminous plate 105, has a similar opening 106 and similar indents 107, 107. In using the device for the dyeing of hollow fiber forms, the fiber 100 is wound upon a series of hollow cylindrical members 108, 108 capable of abutment upon and slidable over the cores 96, 96. These members 108, 108 are composed advantageously of thin metal and have notched, or indented, ends 109, 109, the extended ends being capable of slidably entering the indents of the adjacent members. Fig. 11 shows these members 108, 108 in separate position, while Fig. 12 shows them in placed position one against the other. The upper extended members 109, 109 of the upper member 108 fit within the indents 104, 104 of the plate 102, abutting upon the core 96 and the side of the plate 102 forming a tight joint therewith, while the lower extended members 109, 109 of the lower member 108 enter the indents 107, 107 of the plate 105 forming a similar tight joint. Then the core 96 is inserted and the fiber-wound members 108, 108 are introduced into the device, the dyeing operation is conducted as first described above for the dyeing of fiber masses, the liquid passing upwardly or downwardly through the wound fiber.

Figs. 13 to 17, inclusive, illustrate my device adapted for beam dyeing. The fiber 100 is wound upon a beam 110 comprising a series of hollow cylindrical members 110', 110', having openings, or slots 111, 111; the cylindrical members 110', 110' being arranged in a hollow cylindrical form. The beam 110 has a lower imperforate annular flange 112, and an upper imperforate annular flange 113. The flange 113 has a series of extensions 114, 114, upon which the arm of the rod arm 26 can abut. The upper portion of the beam 110 is formed into the imperforate conical member 115. Around the wound fiber there is placed a chain cover comprised of a series of parallel spaced links 116, 116 joined by the connecting links 117, 117. The links 116, 116 carry a series of inwardly extended hollow cylindrical members 118, 118 having openings, or slots, 119, 119. A hook 120 is placed upon each side of the chain cover in order to bind it closely upon the fiber, the openings 121, 121 fitting over the pivotal members 122, 122. A solid annular follower 123 abuts upon the lower rod arms 26, 26. The operation of the device for beam dyeing is as follows:—

The follower 123 is placed within the dyeing chamber 20 resting upon the lower rod arms 26, 26, the wound beam 110 is then placed within the dyeing chamber 20 upon the follower 123, and the upper rod arms 26, 26 abutted upon the extensions 114, 114 of the flange 113. When the liquid is forced upwardly through the device it passes through the opening 124 of the beam 110 into the hollow interior of the beam and thence outwardly through the cylinders 110, 110 and their openings 111, the wound fiber 100 and the foraminous chain cover into the space 125 between the chain cover and the walls of the dyeing chamber 20, and then upwardly around the flange 113 into the chamber and thence outwardly for continuous circulation. If the liquid is forced downwardly through the device its direction of flow will be the reverse of that described above.

Figs. 18, 19, 20 and 21 illustrate my device adapted to the dyeing of hollow wound fibers, in the dyeing of which the liquid is forced inwardly and outwardly of the wound fiber forms. The fiber 100 is wound around a slatted spindle comprised of two annular members 200, 200 carrying the extended projections 202, 202. A core 203 carries a series of annular members 204, 204 by means of the supports 205, 205. The annular members 204, 204 have a series of indents to allow of the introduction of the projections 202, 202 of the member 200. The core 203 has a hole for the insertion of the hook 206, as a means for withdrawing it from the receptacle. The lower end of the core 203 has the conical member 207 and the annular flange 208. The core 203 is loaded by passing a wound spindle over the core, the projections 202, 202 passing downwardly through the indents in the members 204, 204 of the core, thus preventing the revolution of the spindle. A series of spindles is thus placed upon the core 203, the blades 201, 201 of one spindle entering the openings between the slats of the adjacent spindles. The lower follower comprises a solid member 209 supported on an annular member 210 by means of a series of supporting bars 211, 211. The member 209 has a centrally located recess 212, with a conical recess at its lower portion to receive the cone 207, and a series of recesses 213, 213 to receive the extended slats 201, 201. The upper follower comprises the solid annular member 214 having the centrally located opening 215, and a series of recesses 216, 216 to receive the extended slats 201, 201. A foraminous chain cover is placed around the fiber comprising a series of linked spaced parallel broken serrated flat members 217, 217. The broken ends 218, 218 of the flat members are slidable over each other and are separated by a coiled spring 219, which has a tendency to extend the two members 217, 217. The operation of the device is as follows:—

Figure 22:
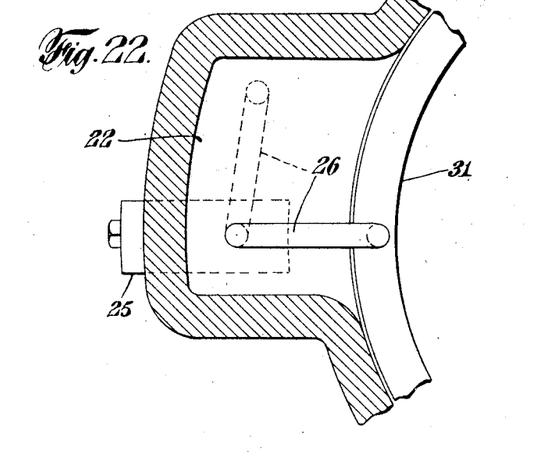
Fig. 22 is a section through the line 22—22 of Fig. 23.
Figure 23:
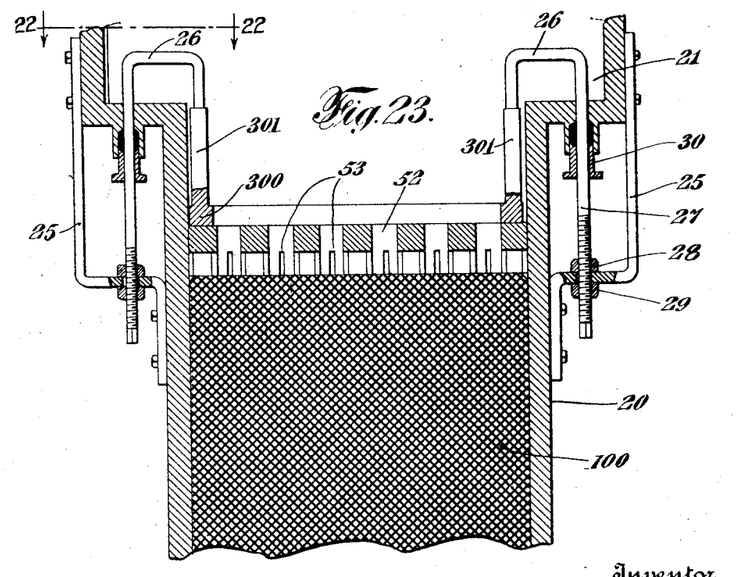
Fig. 23 is a broken vertical section of my device showing a modified form of follower.

The follower 209 is placed within a dyeing chamber 20 so that the annular member 210 abuts upon the lower rod arm 26. The core 203, carrying the wound spindles and the chain cover is placed within the dyeing chamber 20, the extension 207 of the beam resting within the recess of the follower 209, and the blades 201, 201 resting within the recesses 213, 213. The upper follower 214 is then put into place and the fiber compressed by the movement of the upper and lower rod arms 26, 26, 26, 26. The liquid is then forced upwardly around the arms 211, 211 of the follower 209 into the space 220, between the chain cover and the walls of the chamber 20, thence inwardly through the chain cover, the fiber 100, and the spindles, and thence upwardly and outwardly through the space 221, the opening 215 and the chamber 65 for continuous circulation. When the liquid is forced downwardly, it takes a reverse flow from that described above. The modification of the follower shown in Figs. 22 and 23 comprises an annular ring member 300, with a series of upwardly extended arms 301, 301, upon which the shorter arm of the rod arm 26 may be caused to abut.

From the above it will be seen that my device is suitable for the treating and dyeing of all kinds and classes of fibers and fabrics and for determining the condition of the fiber or fabric, without interrupting the treatment operation, hence overcoming the necessity for a number of machines to accomplish these results.

I do not limit myself to the particular size, shape, number or arrangement of parts, as described and shown, all of which may be varied without going beyond the scope of my invention as described and claimed.

What I claim is:—

1. In a dyeing machine, in combination, a series of fiber chambers; an upper and lower removable foraminous plate comprising a series of spaced hollow cylinders within each fiber chamber; means for moving both plates with respect to each other compressing the fiber between them and means for forcing a liquid through the compressed fiber.

2. In a dyeing machine, in combination, a series of fiber chambers; an upper and a lower removable foraminous plate within each fiber chamber; means for moving both plates with respect to each other compressing the fiber between them; a liquid chamber exterior of each plate and means for forcing a liquid through the liquid chambers and the fiber chambers.

3. In a dyeing machine, in combination, a series of fiber chambers; an upper and a lower removable foraminous plate within each fiber chamber; means for moving both plates with respect to each other compressing the fiber between them; a liquid chamber exterior of each plate; liquid diverging means within each liquid chamber and means for forcing a liquid through the liquid chambers and the fiber chambers.

4. In a dyeing machine, in combination, a series of fiber chambers; an upper and a lower removable foraminous plate within each fiber chamber; means for moving both plates with respect to each other compressing the fiber between them and means for forcing a liquid in reverse directions through the device.

5. In a dyeing machine, in combination, a series of fiber chambers; an upper and a lower removable foraminous plate within each fiber chamber; means for moving both plates with respect to each other compressing the fiber between them; means for forcing a liquid in reverse directions through the compressed fiber and means adjacent each plate whereby the flow of liquid will remove the air from below the plate.

6. In a dyeing machine, in combination, a series of fiber chambers; a removable foraminous bottom plate supportable within each fiber chamber; a removable foraminous top plate within each fiber chamber abuttable upon fiber upon the bottom plate; a core within each fiber chamber capable of supporting wound fiber forms; means for moving the two plates with respect to each other compressing fiber between them and means for passing a liquid through the device and fiber contained therein.

7. In a dyeing machine, in combination, a series of fiber chambers; a removable foraminous bottom plate supported within each fiber chamber; a removable foraminous top plate within each fiber chamber; carrying means between the two plates for carrying wound fiber forms; means for supporting the carrying means and means for passing a liquid in reverse directions through the device.

8. In a dyeing machine, in combination, a series of fiber chambers; a removable foraminous bottom plate supported within each fiber chamber; a removable foraminous top plate within each fiber chamber; means within each plate for the reception and retention of carrying means for wound fiber forms; carrying means for carrying and supporting the wound fiber forms and means for passing a liquid continuously through the device in reverse directions.

9. In a dyeing machine, in combination, a series of fiber chambers; a removable foraminous bottom plate supportable within each fiber chamber; a removable foraminous top plate within each fiber chamber abuttable upon fiber upon the bottom plate; a core within each fiber chamber capable of supporting wound fiber forms; resilient means for moving the two plates with respect to each other compressing fiber between them and means for passing a liquid through the device and fiber contained therein.

10. In a dyeing machine, in combination, a series of fiber chambers; a removable foraminous bottom plate supported within each fiber chamber; a removable foraminous top plate within each fiber chamber; carrying means between the two plates for carrying and supporting wound fiber forms; means for supporting the carrying means; means for moving both plates with respect to each other compressing fiber between them and means for passing a liquid in reverse directions through the device.

11. In a dyeing machine, in combination, a series of fiber chambers; a removable foraminous bottom plate supported within each fiber chamber; a removable foraminous top plate within each fiber chamber; carrying means between the two plates for carrying and supporting wound fiber forms; means for supporting the carrying means; a follower abutting upon each plate; means abuttable upon each follower whereby the followers and plates may be moved with respect to each other compressing fiber between them and means for passing a liquid in reverse directions through the device.

12. In a dyeing machine, in combination, a series of fiber chambers; a removable foraminous bottom plate supported within each fiber chamber; a removable foraminous top plate within each fiber chamber; carrying means between the two plates for carrying and supporting wound fiber forms; means for supporting the carrying means; a liquid chamber exterior to each plate and means for passing a liquid continuously through the device in reverse directions.

13. In a dyeing machine, in combination, a series of fiber chambers; a removable foraminous bottom plate supported within each fiber chamber; a removable foraminous top plate within each fiber chamber; means within each plate for the reception and retention of carrying means for wound fiber forms; carrying means for carrying and supporting fiber forms; means for moving the plates with respect to each other compressing fiber between them and means for passing a liquid continuously through the device in reverse directions.

14. In a dyeing machine, in combination, a series of fiber chambers; a removable foraminous bottom plate supported within each fiber chamber; a removable foraminous top plate within each fiber chamber; means within each plate for the reception and retention of carrying means for wound fiber forms; carrying means for carrying and supporting wound fiber forms, resilient means for moving the plates with respect to each other compressing fiber between them; a liquid chamber exterior of each plate and means for passing a liquid continuously through the device in reverse directions.

15. In a dyeing machine, in combination, a series of fiber chambers; a removable foraminous bottom plate supported within each fiber chamber; a removable foraminous top plate within each fiber chamber; means within each plate for the reception and retention of carrying means for wound fiber forms; carrying means for carrying and supporting wound fiber forms; resilient means for moving the plates with respect to each other compressing fiber between them; a liquid chamber exterior of each plate, liquid diverging means within each liquid chamber and means for passing a liquid continuously through the device in reverse directions.

16. In a dyeing machine, in combination, a series of fiber chambers; a removable foraminous bottom plate supported within each fiber chamber; a removable foraminous top plate within each fiber chamber; means within each plate for the reception and retention of carrying means for wound fiber forms; carrying means for carrying and supporting wound fiber forms; resilient means for moving the plates with respect to each other compressing fiber between them; a liquid chamber exterior of each plate; a liquid diverging means within each liquid chamber; means adjacent to each plate whereby air within the device exterior of the fiber chambers will be forced outwardly by the flow of the liquid and means for passing a liquid continuously through the device in reverse directions.

17. In a dyeing machine, in combination, a series of fiber chambers; an upper and a lower removable foraminous plate within each fiber chamber; exterior means for moving both plates with respect to each other compressing the fiber between them and means for forcing a liquid through the compressed fiber.

18. In a dyeing machine, in combination, a series of fiber chambers; an upper and a lower removable foraminous plate within each fiber chamber; exterior means for moving both plates with respect to each other compressing the fiber between them; means for forcing a liquid through the compressed fiber and means adjacent each plate whereby the flow of liquid will remove the air from below the plate.

19. In a dyeing machine, in combination, a series of fiber chambers, an upper and a lower removable foraminous plate within each fiber chamber; exterior means for moving both plates with respect to each other compressing the fiber between them; a liquid chamber exterior of each plate; liquid diverging means within each liquid chamber and means for forcing a liquid through the liquid chambers and the fiber chambers.

20. In a dyeing machine, in combination, a series of fiber chambers; a removable foraminous bottom plate supportable within each fiber chamber; a removable foraminous top plate within each fiber chamber abuttable upon fiber upon the bottom plate; a core within each fiber chamber capable of supporting wound fiber forms, resilient means for moving the two plates with respect to each other compressing fiber between them and means for passing a liquid through the device and fiber contained therein.

21. In a dyeing machine, in combination, a series of fiber chambers; a removable foraminous bottom plate supported within each fiber chamber; a removable foraminous top plate within each fiber chamber; means within each plate for the reception and retention of carrying means for wound fiber forms; carrying means for carrying and supporting wound fiber forms; exterior means for moving the plates with respect to each other compressing fiber between them and means for passing a liquid continuously through the device in reverse directions.

22. In a dyeing machine, in combination, a series of fiber chambers; a removable foraminous bottom plate supported within each fiber chamber; a removable foraminous top plate within each fiber chamber; means within each plate for the reception and retention of carrying means for wound fiber forms; carrying means for carrying and supporting wound fiber forms; resilient means for moving the plates with respect to each other compressing fiber between them; a liquid chamber exterior of each plate; a liquid diverging means within each liquid chamber; means adjacent to each plate whereby air within the device exterior of the fiber chambers will be forced outwardly by the flow of the liquid and means for passing a liquid continuously through the device in reverse direction.

Signed at New York in the county of New York and State of New York this 30 day of November, 1918.

HOWARD M. DUDLEY.